US007385527B1

(12) United States Patent
Clavier et al.

(10) Patent No.: US 7,385,527 B1
(45) Date of Patent: Jun. 10, 2008

(54) SMART AIRPORT AUTOMATION SYSTEM

(75) Inventors: Odile H Clavier, Los Altos, CA (US); David R Schleicher, San Jose, CA (US); Sharon W Houck, Portola Valley, CA (US); John A Sorensen, Cupertino, CA (US); Paul C Davis, Chiloquin, OR (US); Cornelius G Hunter, Cameron Park, CA (US)

(73) Assignee: Sensis Corporation, East Syracuse, NY (US)

( * ) Notice: Subject to any disclaimer, the term of this patent is extended or adjusted under 35 U.S.C. 154(b) by 302 days.

(21) Appl. No.: 11/209,473

(22) Filed: Aug. 23, 2005

Related U.S. Application Data

(63) Continuation of application No. 10/431,163, filed on May 6, 2003, now Pat. No. 6,950,037.

(51) Int. Cl.
*G08B 21/00* (2006.01)
*G06F 19/00* (2006.01)

(52) U.S. Cl. ...................... 340/945; 340/961; 340/971; 701/3; 701/10; 701/14; 455/431

(58) Field of Classification Search ................. 340/945
See application file for complete search history.

(56) References Cited

U.S. PATENT DOCUMENTS

| | | | | |
|---|---|---|---|---|
| 4,196,474 | A * | 4/1980 | Buchanan et al. | 701/301 |
| 5,111,400 | A | 5/1992 | Yoder | |
| 5,265,024 | A | 11/1993 | Crabill et al. | |
| 6,195,609 | B1 * | 2/2001 | Pilley et al. | 701/120 |
| 6,262,679 | B1 | 7/2001 | Tran | |
| 6,380,869 | B1 | 4/2002 | Simon et al. | |

* cited by examiner

*Primary Examiner*—Donnie L. Crosland
(74) *Attorney, Agent, or Firm*—Burr & Brown

(57) ABSTRACT

A smart airport automation system gathers and reinterprets a wide variety of aircraft and airport related data and information around unattended or non-towered airports. Data is gathered from many different types of sources, and in otherwise incompatible data formats. The smart airport automation system then decodes, assembles, fuses, and broadcasts structured information, in real-time, to aircraft pilots. The fused information is also useful to remotely located air traffic controllers who monitor non-towered airport operations. The system includes a data fusion and distribution computer that imports aircraft position and velocity, weather, and airport specific data. The data inputs are used to compute safe takeoff and landing sequences, and other airport advisory information for participating aircraft.

38 Claims, 9 Drawing Sheets

Fig. 6A

600

$$\begin{cases} x_1 = \cos(\psi_{ac}) \\ y_1 = \sin(\psi_{ac}) \end{cases}, \quad \begin{cases} x_2 = \cos(\psi_{leg}) \\ y_2 = \sin(\psi_{leg}) \end{cases}$$

$$den = x_1 y_2 - x_2 y_1$$

*Distance to fly before turn*

$$\begin{bmatrix} x \\ y \end{bmatrix} + a \begin{bmatrix} x_1 \\ y_1 \end{bmatrix} + b \begin{bmatrix} x_2 \\ y_2 \end{bmatrix} = \begin{bmatrix} x_w \\ y_w \end{bmatrix} \quad \text{(Vector equation)}$$

*Solve for :*

$$\begin{bmatrix} a \\ b \end{bmatrix} = \begin{bmatrix} x_1 & x_2 \\ y_1 & y_2 \end{bmatrix}^{-1} \begin{bmatrix} x_w - x \\ y_w - y \end{bmatrix}$$

$$\begin{cases} a = \dfrac{y_2(x_w - x) - x_2(y_w - y)}{(x_1 y_2 - x_2 y_1)} \\ b = \dfrac{x_1(y_w - y) - y_1(x_w - x)}{(x_1 y_2 - x_2 y_1)} \end{cases}$$

$$Distance\_perTimeStep = V_{ac} * TimeStep$$

*where*

$$V_{ac} = \sqrt{V_{x_{ac}}^{\ 2} + V_{y_{ac}}^{\ 2}}$$

$$Niterations = \frac{a}{Distance\_perTimeStep}$$

$$\begin{cases} x_{ac}(t + TimeStep) = x_{ac}(t) + V_{x_{ac}}(t) * TimeStep \\ y_{ac}(t + TimeStep) = y_{ac}(t) + V_{y_{ac}}(t) * TimeStep \end{cases}$$

$$\begin{cases} V_{x_{ac}}(t + TimeStep) = V_{x_{ac}}(t) + a_x(t) * TimeStep \\ V_{y_{ac}}(t + TimeStep) = V_{y_{ac}}(t) + a_y(t) * TimeStep \end{cases}$$

Figure 6B Geometry of Capture Pathway Process

Fig. 8

800

Total Turn

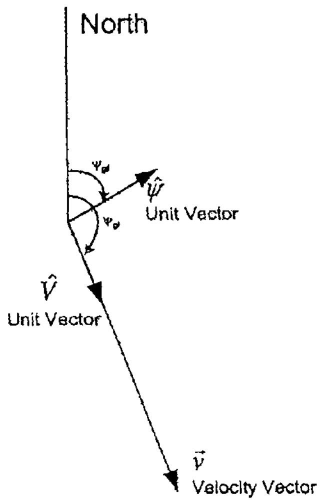

*A / C Turn radius*

$$ac\_TurnRadius = \frac{\sqrt{{V_{x_{ac}}}^2 + {V_{y_{ac}}}^2}}{ac\_TurnRate}$$

*Calculate angle difference $\varphi$ between aicraft and pathway leg*

*Pathway leg groundtrack angle unit vector*

$$\hat{\psi}_{leg} = \left(\cos(\psi_{leg}), \sin(\psi_{leg})\right)$$

$$\hat{V} = \left( \frac{V_{x_{ac}}}{\sqrt{{V_{x_{ac}}}^2 + {V_{y_{ac}}}^2}}, \frac{V_{y_{ac}}}{\sqrt{{V_{x_{ac}}}^2 + {V_{y_{ac}}}^2}} \right)$$

$$\cos(\varphi) = \hat{V} \bullet \hat{\psi}_{leg} = \frac{V_{x_{ac}}}{\sqrt{{V_{x_{ac}}}^2 + {V_{y_{ac}}}^2}} \cos(\psi_{leg}) + \frac{V_{y_{ac}}}{\sqrt{{V_{x_{ac}}}^2 + {V_{y_{ac}}}^2}} \sin(\psi_{leg})$$

$$\sin(\varphi) = \left\| \hat{V} \times \hat{\psi}_{leg} \right\| = \frac{V_{x_{ac}}}{\sqrt{{V_{x_{ac}}}^2 + {V_{y_{ac}}}^2}} \sin(\psi_{leg}) - \frac{V_{y_{ac}}}{\sqrt{{V_{x_{ac}}}^2 + {V_{y_{ac}}}^2}} \cos(\psi_{leg})$$

*Use* $\cos(\varphi)$ *to calculate* $\varphi$*, then if* $\sin(\varphi) < 0$*, let* $\varphi = -\varphi$

*Then* $TotalTurnAngle = \varphi$ $$TurnAngle\_perTimeStep = sign(TotalTurnAngle) * ac\_turnrate * TimeStep$$

SMART AIRPORT AUTOMATION SYSTEM

CROSS REFERENCE TO RELATED APPLICATION

This application is a continuation of U.S. patent application Ser. No. 10/431,163, filed May 6, 2003, now U.S. Pat. No. 6,950,037, the entirety of which is incorporated herein by reference.

FIELD OF THE INVENTION

The present invention relates to air traffic and flight operations control systems, and more particularly to automated systems that collect, organize, retransmit, and broadcast airport and aircraft advisory information collected from sensors and other data sources.

BACKGROUND OF THE INVENTION

Large, busy airports often include a control tower and staffed with air traffic controllers. Some airports are so busy the air traffic control is maintained 24-hours a day, and seven days a week. But some control towers are closed at night. Other airports are so small, or used so infrequently, that there never was a control tower installed so there never are any air traffic controllers on-hand.

At a minimum, pilots flying in or out of airports need to know about other traffic in the area, runways to use, taxi instructions, weather, crosswind advisories, etc. When there is no control tower or staff, pilots must depend on their own sight and hearing, and then self-separate using the Common Traffic Airport Frequency (CTAF) radio channel.

Gary Simon, et al., describe an automated air-traffic advisory system and method in U.S. Pat. No. 6,380,869 B1, issued Apr. 30, 2002. Such system automatically provides weather and traffic advisories to pilots in an area. An airspace model constantly updates records for a computer processor that issues advisory messages based on hazard criteria, guidelines, airport procedures, etc. The computer processor is connected to a voice synthesizer that allows the pilot information to be verbally transmitted over the CTAF-channel.

Kim O'Neil for Advanced Aviation Technology, Ltd., wrote that there are significant opportunities to improve communication, navigation and surveillance services at Scatsta Aerodrome in the Shetland Islands and in helicopter operations in the North Sea, including approaches to off-shore installations. See, http://www.aatl.net/publications/northsea.htm. These improvements can allegedly lead to radical improvements in safety, efficiency and reductions in costs. A key element in achieving these improvements, according to O'Neil, is the full adoption of satellite navigation and data link services and in particular ADS-B. Various forms of VHF and other frequency data links make these improvements possible, and they provide major cost/benefits over existing costs and services. O'Neil says it is time to upgrade existing procedural services to a level more in line with modern aircraft operations. Current procedures, methods and operating practices are expensive, inefficient and adversely affect the commercial operation of air transportation services. Satellite navigation can significantly improve operating procedures, reduce decision heights at airports and improve routes and holding patterns. These all lead to corresponding gains in safety, efficiency and cost reduction. ADS-B messages also provide a communication infrastructure on which many other services can be built at low cost.

Additional services suggested by the prior art include: Airline Operational Communications for aircraft operations efficiency, maintenance and engine performance for improving flight safety, Flight Watch, automated ATIS and related meteorological services, differential GPS corrections and integrity data for improved navigation and flight safety, asset management, emergency and disaster management and coordination, remote monitoring and many other functions. The publication of RTCA MASPS and MOPS, ICAO SARPs, EUROCAE MOPS and American and European Standards for data link and ADS-B, indicates that these technologies can be introduced and certified for many beneficial and cost/effective operational services.

SUMMARY OF THE INVENTION

Briefly, a smart airport automation system embodiment of the present invention gathers and reinterprets a wide variety of aircraft and airport related data and information around unattended or non-towered airports. Data is gathered from many different types of sources, and in otherwise incompatible data formats. The smart airport automation system then decodes, assembles, fuses, and broadcasts structured information, in real-time, to aircraft pilots. The fused information is also useful to remotely located air traffic controllers who monitor non-towered airport operations. The system includes a data fusion and distribution computer that imports aircraft position and velocity, weather, and airport specific data. The data inputs are used to compute safe takeoff and landing sequences, and other airport advisory information for participating aircraft. The smart airport automation system determines whether the runway is occupied by another aircraft, and any potential conflicts, including, for example, in-flight loss of separation between aircraft. The gathered data inputs are organized into useful information and packaged for both graphical display and computer-synthesized voice messages. The data is then broadcast over a data link and the synthesized voice messages are broadcast through a local audio transmitter to aircraft. The smart airport automation system's data is intended for use within at least a 5-nautical mile radius of the airport. The pilots in the area receive voice annunciated audio broadcast signals and data link messages that carry text and pictures for an onboard display screen.

An advantage of the present invention is that a smart airport automation system is provided that enhances pilot situation awareness in airport terminal areas.

Another advantage of the present invention is that a smart airport automation system is provided that helps raise pilot awareness of aircraft in the air or on the runway and may thereby reduce runway incursions and mid-air conflicts.

A further advantage of the present invention is that a smart airport automation system provides efficiently fused information from disparate sources and then distributes this information in various formats to various users in order to increase safety and efficiency in the area around a non-towered airport.

Another advantage of the present invention is that it provides airport situation awareness to the surrounding air traffic management system for their monitoring of airports with or without radar surveillance.

These and other objects and advantages of the present invention will no doubt become obvious to those of ordinary skill in the art after having read the following detailed description of the preferred embodiments, which are illustrated in the various drawing figures.

BRIEF DESCRIPTION OF THE DRAWINGS

FIG. 8 lists some equations useful in a FlyTurn process subroutine called in the process illustrated in FIG. 7.

DETAILED DESCRIPTION OF THE INVENTION

Figure 1:
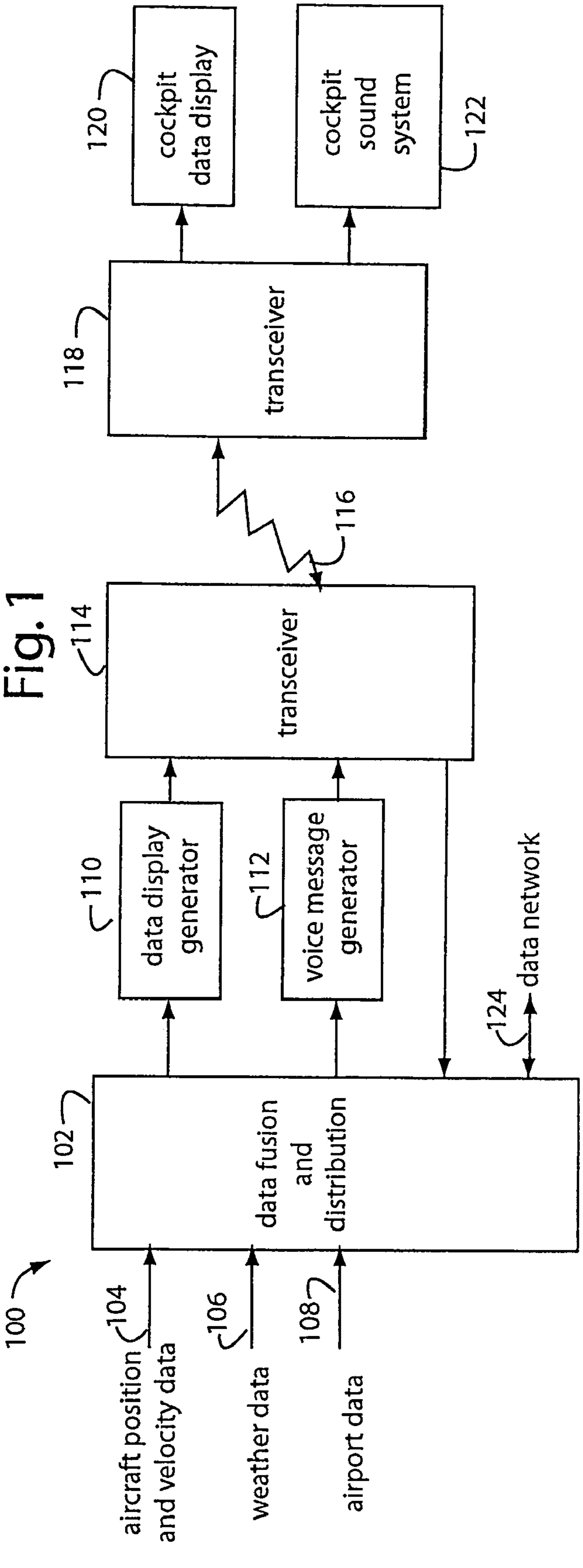
FIG. 1 is a functional block diagram of a smart airport automation system embodiment of the present invention.

FIG. 1 illustrates a smart airport automation system embodiment of the present invention, and is referred to herein by the general reference numeral 100. The system 100 gathers a wide variety of data and information from many different types of sources and in many different formats. It then interprets, fuses and structures information for use in real-time by pilots, e.g., especially approaching or leaving non-towered airports. Such information is also useful to air traffic controllers overseeing non-towered (or unattended towered) airport operations.

A data fusion and distribution computer 102 is provided with aircraft-position-and-velocity data inputs 104, weather data inputs 106, and airport data inputs 108. These are processed into structured information, e.g., airport advisories, takeoff and landing sequences for participating aircraft, separation monitoring, and conflict detection. Such processing outputs information organized and packaged for graphical display and computer-synthesized voice message broadcasts. The data fusion and distribution computer 102 computes and generates airport information, aircraft intending to land, aircraft intending to depart, landing sequence order, potential loss of separation, occupied runways, advisories, etc.

Data for display in the airplane cockpit for the pilots in the immediate area is constructed by a data display generator 110. Voice announcements for the pilots in the immediate area are composed by a synthesized voice message generator 112. These messages are broadcast thru a local audio transceiver 114 over a radio link 116 to the several onboard transceivers 118 in the immediate area. Such messages are intended for use by aircraft operating in the terminal maneuvering area including at least those within a five-nautical mile radius of the airport. It can also be sent through networks to air traffic control, airport safety and security and other interested parties, such as, for example, remote system maintenance personnel. Transceivers 118 output to a cockpit data display 120 and cockpit sound system 122.

Such information generated by the data fusion and distribution computer 102 is provided to a data network connection 124, e.g., via the Internet. Such would allow traffic controllers and other overseers to monitor remote unattended airports and intervene when necessary. The data network connection 124 may also be used to control special airport lighting systems, e.g., runway lights, taxi messages, warning lights, etc.

The aircraft position and velocity data inputs 104 can be synthesized from airport surveillance radar, onboard GPS-based surveillance broadcast systems, and multilateration transponder-based systems, etc. For example, some conventional aircraft include automated dependent surveillance broadcast (ADS-B) systems that broadcast GPS position, velocity, and intent information about the particular aircraft to other aircraft and ground stations. ADS-B reports provide identity, position, altitude, velocity, heading, and other information about an aircraft. A complete collection of such reports from a particular area can provide a very good current picture of airport traffic conditions. Other information sources include automated surface observation system (ASOS), automated weather observation system (AWOS), traffic information service broadcast (TIS-B), and flight information services broadcast (FIS-B) transmissions. Transponder-equipped aircraft signals can provide ground station with enough data to compute the precise locations of the aircraft by multilateration.

The airport data 108 preferably includes airport name and identifier, runway configuration data, preferred runway landing directions, typical airport approach and departure patterns and associated pathways, noise-sensitive areas, and other airport-unique information. Information collection and fusion involves local weather, preferred runway, aircraft-in-pattern, runway occupied/not. The information collected can also be used to activate specialized lighting (e.g., to support runway incursion alerts and ground conflicts).

The messages, displays, and text preferably received by the pilots in the approaching and leaving aircraft include (a) weather and other airport information, (b) sequencing information on how the particular aircraft should sequence to and from the runway relative to other aircraft, (c) traffic information related to potential loss of separation warnings, and (d) safety alerts including runway incursion information. Tables I-IV are examples of audio advisories spoken by cockpit sound system 122.

TABLE I

| |
|---|
| Airport Advisory: "Moffett Field, wind 320 at 10, active runway 32R, there are two aircraft within 5 miles of the airport" |

TABLE II

| |
|---|
| Sequence Advisory: "Aircraft 724 is #1. Aircraft 004 is #2 follow traffic on right downwind." |

TABLE III

| |
|---|
| Runway Advisory: "Runway is occupied by aircraft 724" |

TABLE IV

| |
|---|
| Traffic Advisory: "Warning! Warning! Aircraft 724 has traffic 1:00, 3 miles, 1,100 ft heading southeast. Aircraft 004 has traffic 11:00, 3 miles, 800 ft heading south." |

Figure 2:
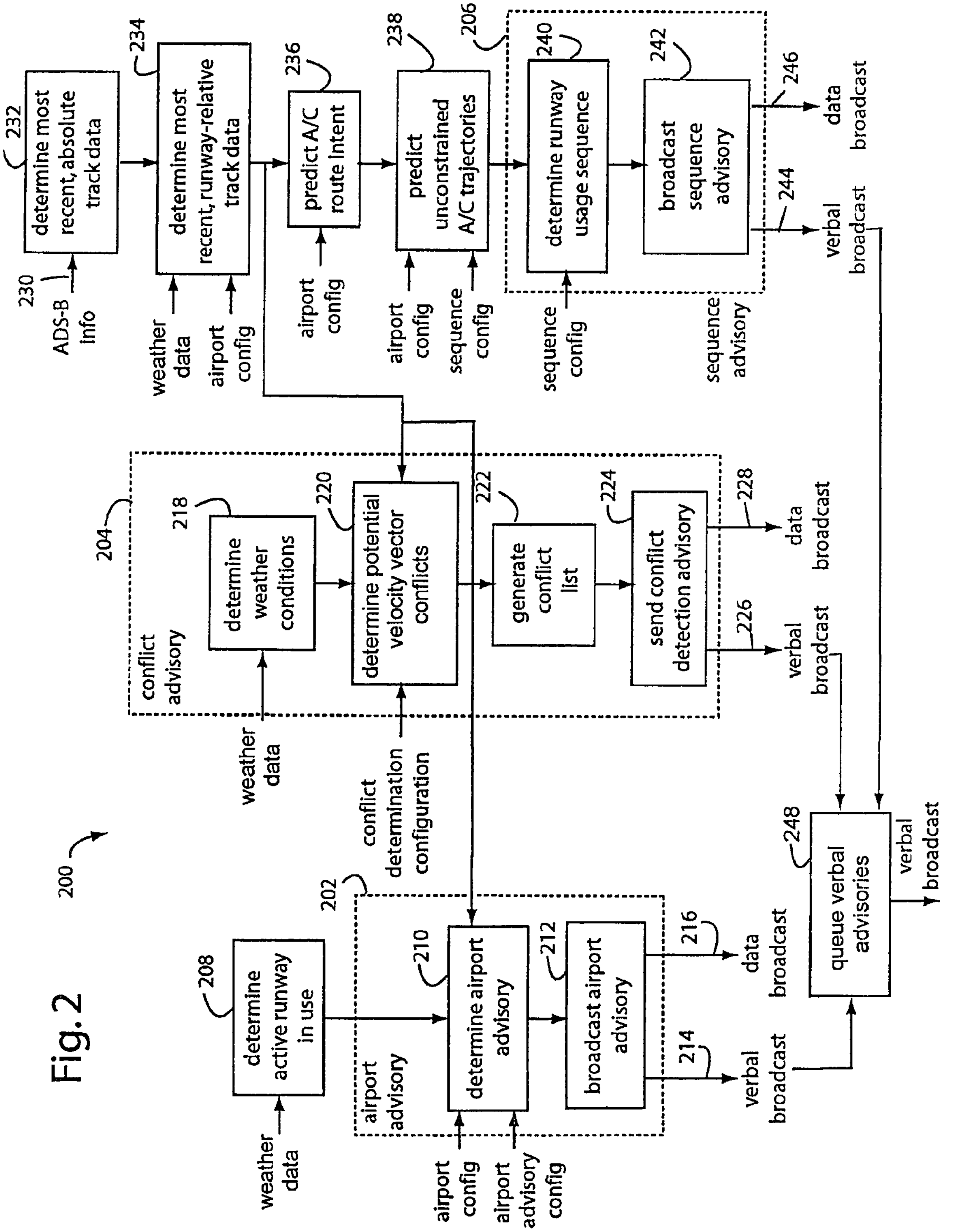
FIG. 2 is a functional block diagram of advisory generator embodiment of the present invention that can be used in the system illustrated in FIG. 1.

FIG. 2 illustrates a smart airport automation system advisory generator embodiment of the present invention, and is referred to herein by the general reference numeral

200. The advisory generator 200 comprises an airport advisory subsystem 202, a conflict advisory subsystem 204, and a sequence advisory subsystem 206. A process 208 uses weather and airport configuration data to determine the active runway in use. A process 210 inputs airport and airport advisory configuration data along with aircraft position data from process 234 to determine an airport advisory message. A process 212 broadcasts an airport advisory via an audio broadcast 214 and a data broadcast 216. A process 218 determines whether local weather conditions are "visual" or "instrument" meteorological conditions and, in combination with aircraft position data from process 234, feeds this to a process 220 which determines potential aircraft conflicts (e.g., predicted reductions in safe separation distance) based on weather-based safe separation criteria. It inputs conflict determination configuration data, and generates a conflict list 222. A process 224 sends out a conflict detection advisory message via an verbal broadcast 226 and a data broadcast 228.

Any ADS-B information sent by aircraft so equipped is contributed to a process 232 for determining the most recent absolute track data of local air traffic. A process 234 determines the most recent runway relative track data from aircraft and airport configuration data inputs as well as a local weather data source. A process 236 predicts aircraft route intentions and forwards these to a process 238 that predicts unconstrained aircraft trajectories. Airport configuration and sequence configuration data are used by process 238. The results are forwarded to a process 240 for determining runway usage sequences. A process 242 broadcasts runway sequence advisory messages via an synthesized voice broadcast 244 and a data broadcast 246. Subsystem 248 provides intelligent queuing of the audio broadcast advisories.

Figure 3:
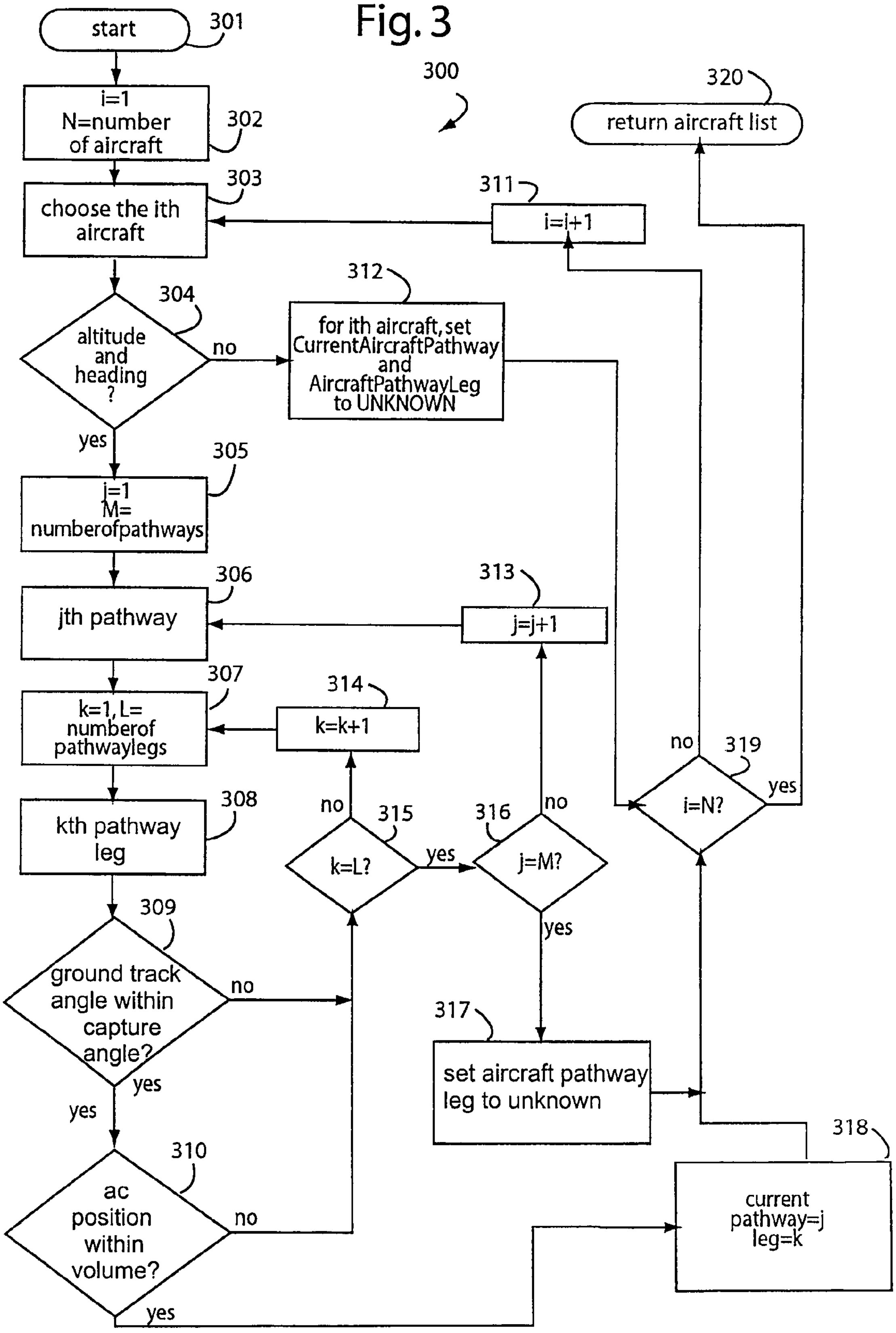
FIG. 3 is a flowchart of a process embodiment of the present invention for predicting an aircraft flight path.

FIG. 3 represents a process 300 for predicting the aircraft route intent using intent inferencing through the use of a unique system of predefined "pathways". The term "pathway" reflects a series of individual airspace volumes and associated band of direction (i.e., ground track angles) in the terminal area that represent potential "legs" in an aircraft's potential intent. For example, you can define pathways that represent a "downwind", "base", and "final" path segments for a given runway configuration. Process 300 starts with a step 301. A step 302 initializes the process with a first aircraft in a list. A step 303 chooses the next $i^{th}$ aircraft in the list to process. Step 304 checks altitude and range from the airport. If both are less than a preset maximum, step 305 initiates a loop to determine what pathway the aircraft is on. A step 306 chooses an $i^{th}$ pathway. A step 307 sets the number of pathway legs for the $j^{th}$ pathway. A step 308 chooses a $k^{th}$ pathway leg for the $j^{th}$ pathway. A step 309 checks to see if the current aircraft's ground track angle is within two designated ground track angles (i.e., capture angles) for the pathway leg. If within the designated pathway's capture angles, a step 310 checks to see if the aircraft location is within the pathway leg coverage volume. If the answer is "no" to either process 309 or 310, and the last pathway leg for a given pathway is not chosen (when compared in step 315), then step 314 moves the analysis on to the next pathway leg. If it is the last pathway leg, steps 316 and 313 move the search on to the next pathway, but if this is the last pathway, step 317 is used to set the aircraft pathway and pathway leg to "UNKNOWN" (analogous to step 312). If the aircraft position is within the pathway leg volume, then, a step 318 sets the current aircraft pathway to "j" and leg to "k". A test 319 sees if the outermost loop is finished. If no, the process proceeds to a step 311 where the aircraft list is incremented and the process repeats for the next aircraft on the list. If yes, a step 320 returns with the aircraft ID, the aircraft pathway and leg selections for all of the aircraft on the list.

Figure 4:
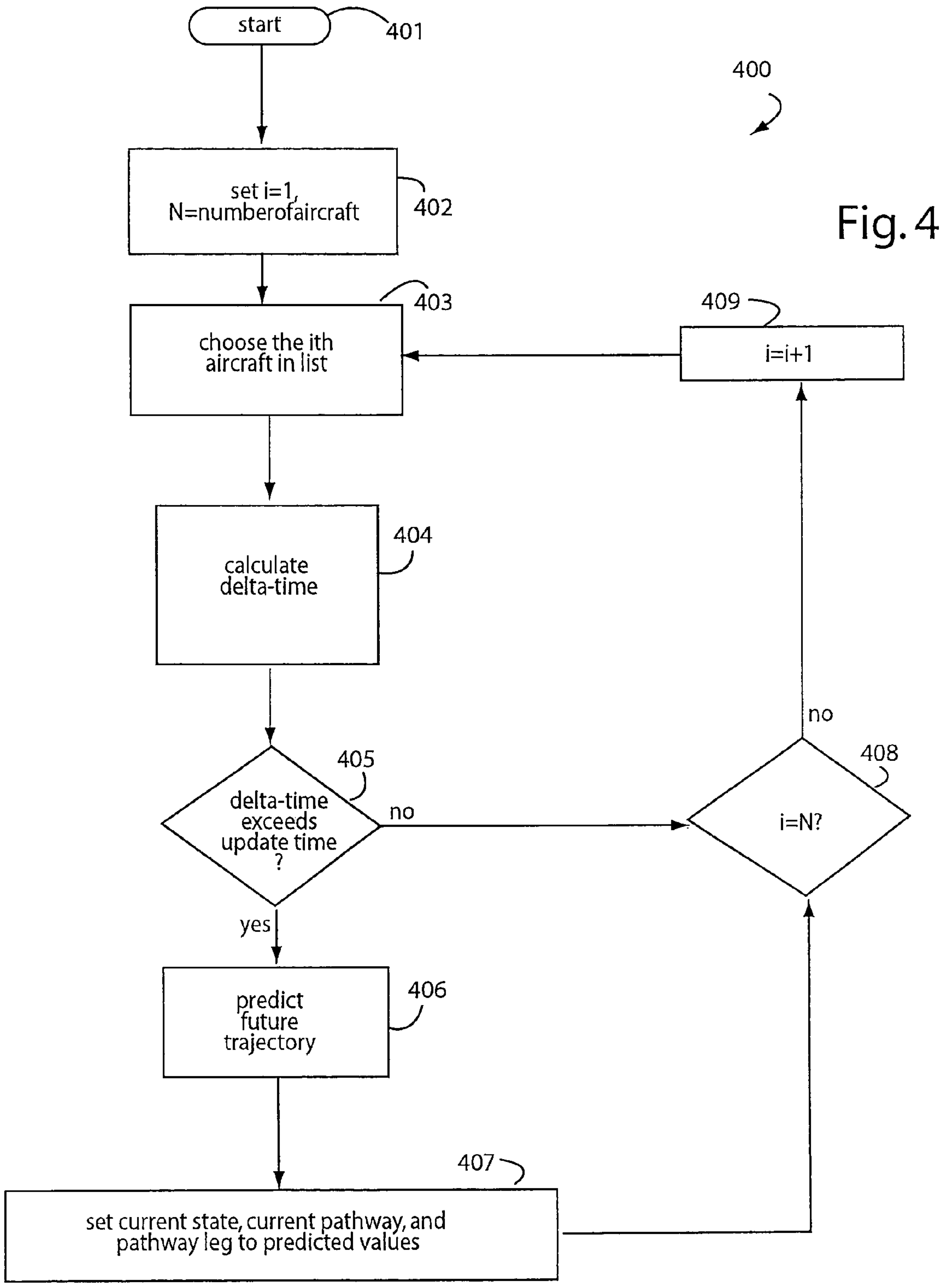
FIG. 4 is a flowchart of a process embodiment of the present invention for determining if data from an aircraft has become unavailable and therefore the smart airport must extrapolate the trajectory of that aircraft.

FIG. 4 represents a process 400 for determining that data for a particular aircraft has become unavailable (e.g., due to surveillance dropouts) and therefore the trajectory must be extrapolated. It determines when aircraft are sending outdated ADS-B messages and predicts their trajectories based on its last known status. It starts with a step 401. A step 402 initializes the process with a first aircraft in a list. A step 403 chooses the next aircraft to process in a program loop. A step 404 calculates the delta-time based on the difference between the current time and the time associated with the last aircraft state message time. A test 405 sees if the delta-time exceeds a predetermined sequence update time. If so, a step 406 predicts the future trajectory based on extrapolation of the last aircraft state message. A step 407 sets current state, current pathway and pathway leg to the predicted ones. A test 408 sees if the loop has finished. A step 409 increments the loop index. Process 400 estimates an aircraft's state information for no more than a configurable coast time interval, such as 15 seconds at which point it deletes that aircraft from the processing string.

Figure 5:
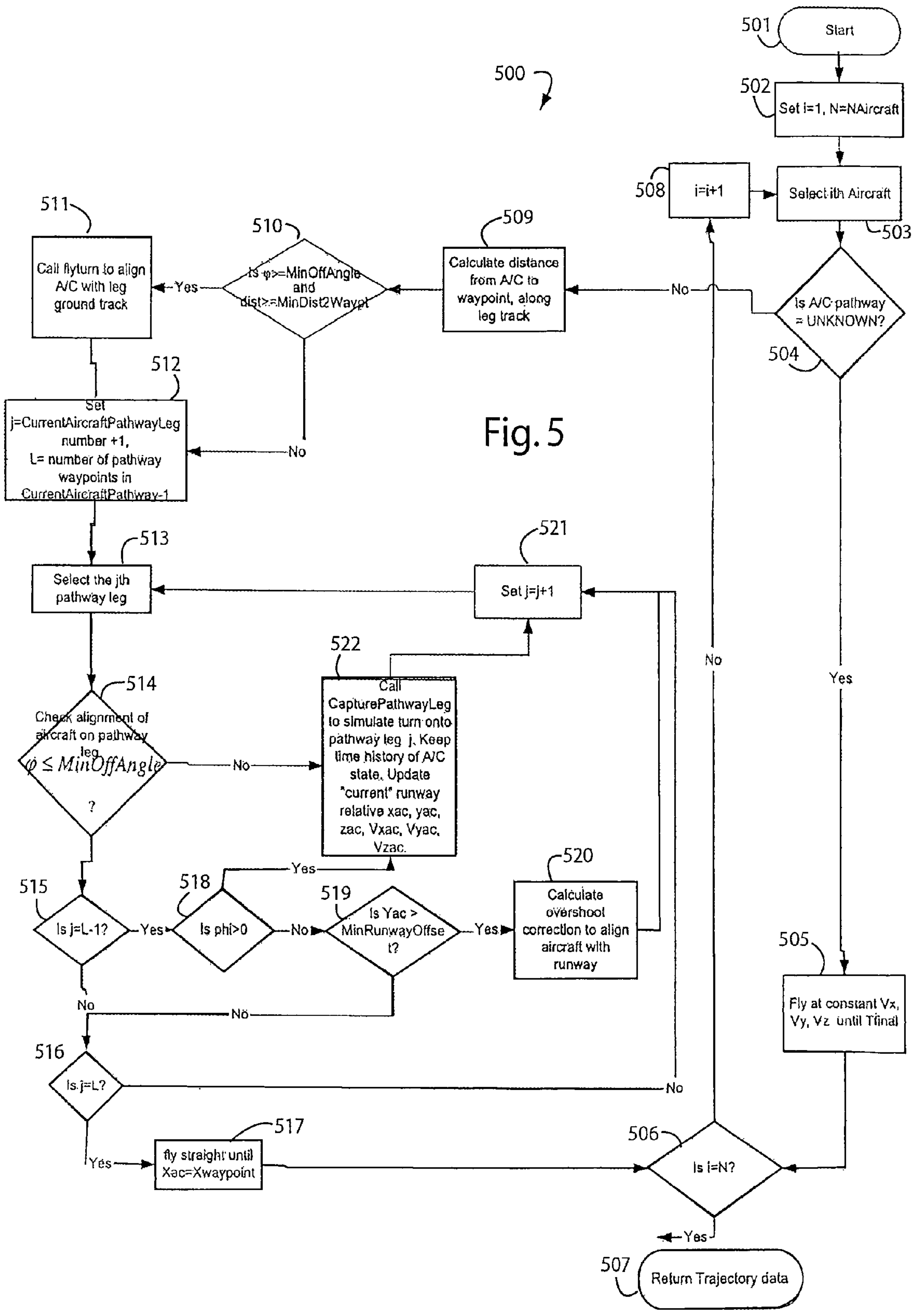
FIG. 5 is a flowchart of a process embodiment of the present invention for predicting unconstrained aircraft trajectories.

FIG. 5 represents a process 500 for predicting unconstrained aircraft trajectories. The process 500 determines whether an aircraft needs to turn to the next pathway leg or fly straight to the next pathway leg. If the plane is not on an arrival or departure leg, and is on an UNKNOWN leg, the simulation assumes the plane will fly straight for a given maximum time to some final approach pathway. The process 500 returns the trajectory data for each aircraft including a time history of the trajectory e.g., for each time step there is a new $x_{ac}$, $y_{ac}$, $z_{ac}$, $V_{xac}$, $V_{yac}$, $V_{zac}$. If the aircraft's ground track angle is already aligned with the current aircraft pathway leg, the simulation assumes it will capture the next pathway leg. If the aircraft is on the last leg, e.g., the runway, and its ground track angle is aligned with the runway ground track angle, it flies straight until it reaches the end of the runway ($X_{ac}=X_{runwaywaypoint}$). Process 500 starts with a step 501. A step 502 initializes the process with a first aircraft in a list. A step 503 chooses the next aircraft to process. A test 504 sees if the aircraft's pathway is considered UNKNOWN. If so, a step 505 assumes a constant trajectory until a predetermined number of seconds has elapsed, i.e., Tfinal. A test 506 sees if the loop is finished. If so a step 507 returns the predicted trajectory data. If not, a step 508 increments the loop counter. If test 504 returns a no, a step 509 calculates the distance from the aircraft to the waypoint along the leg track. A test 510 sees if the ground track angle and distance variation from the nominal pathway leg ground track angle and centerline exceed predetermined minimums. If they do, a step 511 calls FlyTurn to project the future aircraft trajectory and align the aircraft with the pathway leg ground track. A step 512 sets the pathway leg and waypoints. A step 513 selects the next pathway leg. A test 514 checks the alignment of the aircraft ground track angle relative to the next pathway leg. If test 514 returns a yes, a test 515 tests an inner loop index to determine whether the current pathway leg is the next-to-last. If test 514 returns a no, the process proceeds to step 522, which is discussed below. If step 515 returns a no, a test 516 tests loop index j to determine whether the current pathway is the final one. If finished with the loop, a step 517 assumes straight flight to the next waypoint. If test 515 returns a no, a test 518 sees if the ground track angle deviation is greater than zero. If not, a test 519 looks for a minimum runway offset. If yes, a step

520 calculates the overshoot correction required to align the aircraft with the final pathway leg. A step 521 increments the j-loop counter. A step 522 calls a capture-pathway-leg process to simulate a turn onto pathway leg j. The distance to the waypoint along the track can be computed with, $d=\sqrt{(x_{ac}-x_w)+(y_{ac}-y_w)}$, dist2waypt=d*cos(ϕ), and ϕ is the angle difference between the aircraft ground track angle and pathway leg ground track angle, and $(x_w, y_w)$ is the waypoint location.

Figure 6:
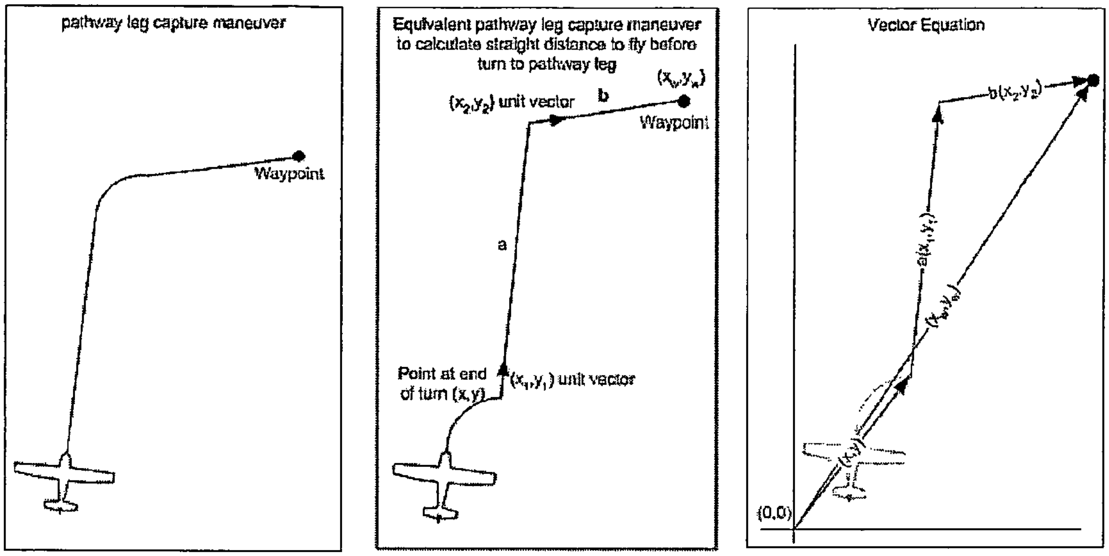
FIG. 6A is a set of mathematical equations useful in the capture pathway leg processing.
FIG. 6B is a diagram depicting the geometry of the capture pathway process

FIG. 6A lists some capture pathway leg equations that are useful in the capture pathway leg process. In order to capture a pathway leg, a plane may need to fly a certain distance before initiating the turn. To calculate that distance, the process calculates the turn as if it was initiated right away to determine the geographic location of the point at the end of the turn. The straight distance to fly is then calculated as the distance between the end point of the turn to the intersection with the leg to be captured. The distance is calculated by using vector addition. First the unit vector for the straight leg is calculated simply using current ground track angle of the aircraft. A unit vector for the leg direction is calculated using leg ground track angle. A vector from the reference frame center to the leg waypoint is the sum of the vector from the center to the end point of the turn, the unit vector on straight leg multiplied by the straight distance a, and the unit vector on the leg multiplied by the distance to fly on the leg, a and b are the two constants to solve for. FIG. 6B helps to clarify the geometry involved in the capture pathway process.

Figure 7:
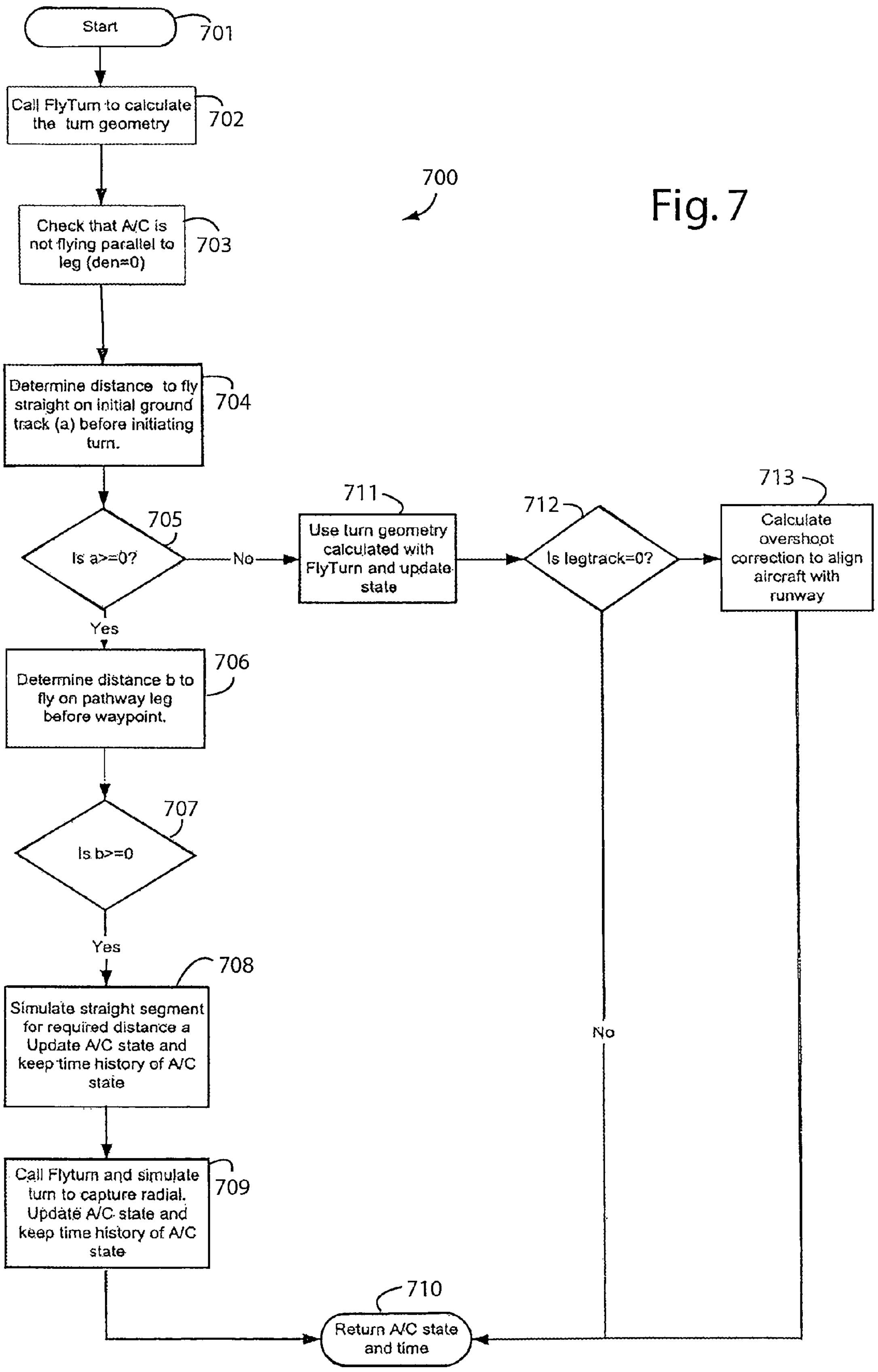
FIG. 7 is a flowchart of a process embodiment of the present invention for capturing a pathway leg.

FIG. 7 represents a process 700 for capturing a pathway leg. The process 700 starts with a step 701. A step 702 calls a FlyTurn subroutine to calculate the turn geometry. A step 703 checks to see that the aircraft is not flying parallel to the leg. A step 704 determines the distance to fly before turning. A test 705 tests for track "a" greater or equal to zero. If yes, a step 706 determines the distance "b". A test 707 sees if "b" is not negative. If not negative, then a step 708 simulates a straight segment and updates the aircraft state. A step 709 calls FlyTurn to capture a radial. A step 710 returns the aircraft state and time. If test 705 was "no", then a step 711 uses the turn geometry calculated with FlyTurn and updates the state. A test 712 sees if legtrack=0. If so, a step 713 calculates the overshoot correction to align the aircraft with the runway.

FIG. 8 lists some equations useful in a FlyTurn process subroutine. The FlyTurn process simulates the aircraft in a turn. It assumes a predefined constant turn rate. The simulation simulates incremental turns for each time step, and calculates the new state of the aircraft at each time step. The total number of iterations needed to simulate the whole turn may not be an exact integer number of time steps. Calculations must account for the turn made during the last fraction of a timestep.

An airport automation system embodiment of the present invention includes a set of data inputs for extracting aircraft and airport-related information local to an airport for a plurality of sources and in a plurality of different data formats. A processor is used for computing from the set of data inputs an airport advisory information, takeoff and landing sequencing for participating aircraft, runway occupied status, separation monitoring, and conflict detection, and for providing unified nearby aircraft positions and velocities, weather, and airport structured information. A broadcasting system sends graphical display and audio messages to the cockpits of local aircraft from the processor. Such system can synthesize aircraft position and velocity data from at least one of airport surveillance radar, airborne surveillance broadcast transceivers, onboard local aircraft, multilateration, and other transponder-based systems. The data inputs typically include airport-unique information is gathered for broadcast, and includes at least one of airport name, airport identifier, active runway, airport visual flight rule patterns, and airport instrument-approach pathways. A connection, e.g., to the internet, can be used for activating specialized airport runway lighting that is dependent on any information being broadcast.

A smart airport automation system advisory generator has a process that inputs weather and airport configuration data to determine that active runway in use, and a process that inputs airport configuration data to determine an airport advisory message, and that broadcasts an airport advisory via an audio broadcast and a data broadcast. A conflict advisory subsystem determines aircraft position and velocity state information, and determines potential aircraft conflicts. It sends conflict detection advisory message broadcasts. A sequence advisory subsystem uses aircraft surveillance information in determining a most recent absolute track data of local air traffic, and predicts aircraft route intentions, unconstrained aircraft trajectories, and aircraft runway usage sequences, for broadcasting runway sequence advisory messages.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A smart airport automation system for managing the operation of a plurality of vehicles on an airport surface or in the surrounding airspace, comprising:

a plurality of data inputs containing aircraft and airport-related information for an airport from a plurality of sources and in a plurality of different data formats;

at least one processor for decoding, assembling, associating, correlating and fusing said plurality of data inputs into structured data, and for distributing said structured data in real-time, wherein said at least one processor computes vehicle position data for vehicles on or near said airport surface in real-time, projects vehicle trajectories or movements, and identifies or predicts unsafe conditions from said projected vehicle trajectories or movements;

a vehicle sequence determination system that uses the projected vehicle trajectories to compute a desired sequence among vehicles, and a communications system that transmits in real-time said structured data and advisories comprising sequence advisories containing said desired sequence among vehicles to vehicles on or near said airport surface.

2. The smart airport automation system of claim 1, wherein said data inputs for computing aircraft position data comprises at least one of surveillance radar, multilateration, ADS-B or other transponder-based surveillance systems.

3. The smart airport automation system of claim 1, wherein said at least one communications system transmits said structured data over a voice communications system.

4. The smart airport automation system of claim 3, wherein said communications system uses synthesized voice technology to generate said messages for broadcast over a voice communications system.

5. The smart airport automation system of claim 1, wherein said at least one communications system transmits said structured data over a data link as digital data and graphics for display.

6. The smart airport automation system of claim 1, wherein said at least one communications system transmits said structured data over a data link as digital data and graphics for display, for aircraft suitably equipped, or over a voice communications system.

7. The smart airport automation system of claim 1, further comprising an interface for activating and deactivating airport lighting automatically based upon current aircraft position, projected trajectory and intent information.

8. The smart airport automation system of claim 1, wherein said communications system further comprises a communications link to air traffic control facilities.

9. The smart airport automation system of claim 1, wherein said communications system further comprises a communications link to airport safety and security facilities.

10. A smart automation system for managing the operation of a plurality of vehicles on an airport surface or in the surrounding airspace, comprising:

an advisory subsystem that determines the active runway or runways in use and their utility for safe landing and takeoff operations;

a vehicle locating subsystem that determines the current position and velocities for vehicles on or near said airport surface in real-time;

a trajectory estimation system that projects and predicts the trajectories of a plurality of vehicles based upon current and historical state and status data extracted from vehicle surveillance sources, vehicle performance capabilities, intent, and stored local surface and air traffic pattern data;

a vehicle sequence determination system that uses projected trajectories to compute a desired sequence among vehicles; and a communication system that transmits structured data comprising airport information, vehicle location and intent, and advisories comprising sequence advisories containing said desired sequence among vehicles to vehicles on or near said airport surface.

11. The smart airport automation system of claim 10, further comprising a vehicle conflict detection system that identifies or predicts unsafe condition from projected trajectories and generates advisories for identified or predicted unsafe conditions.

12. The smart airport automation system of claim 10, wherein the communication system utilizes synthesized voice messages transmitted over a voice communication system.

13. The smart airport automation system of claim 10, wherein the communication system is a digital data link.

14. The smart airport automation system of claim 11, wherein the communication system transmits digital data and graphics over a data link, for vehicles suitably equipped, or transmits synthesized voice messages over a voice communication system.

15. The smart airport automation system of claim 11, further comprising an airport lighting control system that automatically turns on and off airfield lighting for safe night and low visibility operations.

16. The smart airport automation system of claim 11, wherein the conflict detection system identifies or predicts that a loss of acceptable safe separation will occur.

17. The smart airport automation system of claim 11, wherein the conflict detection system identifies or predicts that a vehicle is in risk of upset due to wake vortex phenomena.

18. The smart airport automation system of claim 11, wherein the conflict detection system identifies or predicts a vehicle's potential collision with an obstruction based on the vehicle's trajectory, airport configuration and local terrain.

19. The smart airport automation system of claim 11, wherein the conflict detection system identifies or predicts a runway incursion.

20. The smart airport automation system of claim 11, wherein the conflict detection system identifies or predicts a vehicle is intending to use the wrong runway because of unsafe wind or surface conditions.

21. The smart airport automation system of claim 11, further comprising a processor that generates and communicates safety and status messages to inform authorities of airport status.

22. A smart airport automation system for use at unattended or non-towered airports comprising:

means for receiving airport-related information from one or more airport-related information systems using one or more data formats;

means for generating airport specific data;

means for determining in real-time the position of low altitude aircraft in the vicinity of said airport and aircraft or vehicles on the surface of said airport from sources using one or more data formats;

means for fusing, organizing and distributing said aircraft and vehicle position data, airport-related information and airport specific data from said one or more airport-related information systems using one or more data formats into structured data in a single format in real-time;

means for predicting vehicle trajectories and movements based upon at least one of current and historical position data, vehicle performance capabilities, intent, and stored local surface and air traffic pattern data;

means for predicting and detecting potential vehicle conflicts based on predicted trajectories, intentions and vehicle movements;

a means for determining a desired vehicle sequence based on at least projected trajectories and movements of vehicles on or near said airport surface; and means for communicating said structured data and advisories comprising sequence advisories containing said desired vehicle sequence in real-time to vehicles in the vicinity or on the surface of said airport.

23. The smart airport automation system of claim 22, wherein said means for organizing and distributing said structured data comprises generating formatted messages comprising airport advisory information, runway sequence advisories, conflict detection advisories and position data and intentions of other proximate vehicle traffic on or near said airport surface.

24. The smart airport automation system of claim 22, wherein said means for predicting and detecting potential vehicle conflicts monitors aircraft separation and separation distance thresholds between sequential vehicles on or near said airport surface.

25. The smart airport automation system of claim 22, further comprising a means for activating and deactivating airport lighting automatically based upon current aircraft position, projected trajectory and intent information.

26. A smart airport automation system advisory generation system for use at unattended or non-towered airport, comprising:

an airport advisory subsystem that receives weather and airport configuration data, determines the active runway(s) in use, its utility for conducting safe flight operations;

an aircraft trajectory estimation system to predict each aircraft's future unconstrained trajectory (a) from position and velocity data extracted from aircraft surveillance sources, (b) known flight intent, (c) recent aircraft trajectory histories, and (d) stored local air traffic pattern data;

a takeoff and landing sequence determination system that uses projected unconstrained aircraft trajectories and aircraft takeoff and landing intentions to compute a desirable runway usage sequence among aircraft and generates a runway sequence advisory message;

an aircraft conflict detection system that uses aircraft projected trajectories and intentions to compute potentially unsafe conditions and loss of desired aircraft separations within a runway usage sequence;

wherein said aircraft conflict detection system generates a conflict detection advisory message upon occurrence or prediction of unsafe conditions or loss of acceptable safe separation;

an airport communications system which transmits at least said runway sequence advisory messages and said conflict detection advisory messages to aircraft in the vicinity of the airport as digital data and graphics over a data link, for aircraft suitably equipped, and over a voice communications system; and an airport lighting control system that uses the current aircraft position, projected trajectory and intent information to automatically turn on and off runway and taxiway lighting, as appropriate, for safe night and low visibility operations.

27. A smart airport automation system of claim 26, wherein said aircraft conflict detection system identifies or predicts (a) loss of sufficient separation for wake vortex safety, or (b) a landing will take place on a runway occupied by another aircraft.

28. A smart airport automation system of claim 26, wherein said airport communications system broadcasts said auditory messages to aircraft using voice synthesis technology and the common terminal advisory frequency (CTAF).

29. The smart airport automation system of claim 26, further comprising a processor for organizing information for graphical display and for generating computer-synthesized voice and digital messages for their transmission to local aircraft.

30. The smart airport automation system of claim 26, further comprising a communications link to air traffic control facilities to provide ATC a means for monitoring remote unattended airports.

31. The smart airport automation system of claim 26, further comprising a communications link to airport safety and security facilities.

32. The smart airport automation system of claim 31, wherein said communications link for transmitting said structured data to airport security is a data network connection.

33. The smart airport automation system of claim 32, wherein said data network connection uses the Internet.

34. The smart airport automation system of claim 26, wherein said data network connection can be used to automatically turn on and turn off special airport lighting systems.

35. A smart airport automation system for use at unattended or non-towered airports comprising:

means for receiving airport-related information from one or more airport-related information systems using one or more data formats;

means for generating airport specific data;

means for determining the position of low altitude aircraft in the vicinity of said airport and aircraft on the surface of said airport from surveillance sources using one or more data formats;

means for fusing said aircraft position data, said airport-related information and said airport specific data into structured data in a single format that is organized and packaged for graphical display, which includes takeoff and landing sequences for aircraft;

means for predicting vehicle trajectories and movements based upon at least one of current and historical position data, vehicle performance capabilities, intent, and stored local surface and air traffic pattern data;

means for detecting potentially unsafe conditions and loss of desired aircraft separation based on aircraft projected trajectories and intentions, and generating a conflict advisory if unsafe conditions or loss of desired aircraft separation is predicted or occurs;

means for determining a desirable vehicle sequence based on at least projected trajectories and movements of vehicles on or near said airport surface;

means for distributing and transmitting said structured data to aircraft and vehicles in the vicinity or on the surface of said airport; and means for automatically turning on and off runway and taxiway lighting using current aircraft position, projected trajectory and intent information for safe night and low visibility operations.

36. A smart airport automation system of claim 35, wherein said means for detecting potentially unsafe conditions predicts at least loss of sufficient separation for wake vortex safety, or a landing will take place on a runway occupied by another aircraft.

37. The smart airport automation system of claim 35, wherein said means for transmitting said structured data is a data link.

38. The smart airport automation system of claim 35, wherein said means for transmitting said structured data is a voice communications system.

* * * * *